United States Patent [19]

Crorey et al.

[11] Patent Number: 5,632,588
[45] Date of Patent: May 27, 1997

[54] AUTOMATIC TOOL CHANGER

[75] Inventors: David J. Crorey, Utica, Mich.; Leland D. Blatt, 21 Carrington Pl., Grosse Pointe Farms, Mich. 48236

[73] Assignee: Leland D. Blatt, Grosse Pointe Farms, Mich.

[21] Appl. No.: 368,428

[22] Filed: Jan. 4, 1995

Related U.S. Application Data

[60] Division of Ser. No. 34,565, Mar. 19, 1993, Pat. No. 5,452,981, which is a continuation-in-part of Ser. No. 756,492, Sep. 9, 1991, Pat. No. 5,222,854, and Ser. No. 978,134, Nov. 18, 1992, abandoned, which is a division of Ser. No. 665,029, Mar. 6, 1991, Pat. No. 5,174,709.

[51] Int. Cl.$^6$ ................................. B65G 47/90
[52] U.S. Cl. ................... 414/225; 901/30; 901/41
[58] Field of Search .................... 414/225, 627, 414/731, 737, 744.1, 744.8, 749, 751-2; 901/6, 17, 21, 30, 40-41; 198/375, 468.2, 468.4, 468.5, 468.6; 100/207; 212/177

[56] References Cited

U.S. PATENT DOCUMENTS

| | | | |
|---|---|---|---|
| 904,457 | 11/1908 | Schuman . | |
| 2,971,389 | 2/1961 | Blatt | 74/110 |
| 3,179,262 | 4/1965 | Carlson, Sr. et al. . | |
| 3,665,771 | 5/1972 | Blatt | 72/29 |
| 4,037,730 | 7/1977 | Fetzer et al. . | |
| 4,193,731 | 3/1980 | Blatt et al. | 414/589 |
| 4,279,561 | 7/1981 | Schneider et al. | 414/591 |
| 4,280,786 | 7/1981 | Dyche | 414/749 |
| 4,378,592 | 3/1983 | Heiberger | 364/476 |
| 4,386,693 | 6/1983 | Bachman | 198/409 |
| 4,400,984 | 8/1983 | Rönbeck | 74/103 |
| 4,466,531 | 8/1984 | Baugher | 198/486 |
| 4,475,863 | 10/1984 | Blatt et al. | 414/589 |
| 4,509,638 | 4/1985 | Kato et al. | 198/486 |
| 4,512,709 | 4/1985 | Hennekes et al. | 901/41 X |
| 4,520,550 | 6/1985 | Dunn et al. | 901/41 X |
| 4,553,444 | 11/1985 | Blatt | 74/110 |
| 4,585,389 | 4/1986 | Watanabe et al. | 414/752 |
| 4,589,819 | 5/1986 | Shirao | 414/752 |
| 4,604,787 | 8/1986 | Silvers, Jr. | 414/730 X |
| 4,636,135 | 1/1987 | Bancon | 901/41 X |
| 4,643,634 | 2/1987 | Duina | 414/749 |
| 4,649,622 | 3/1987 | Scott | 29/568 |
| 4,661,040 | 4/1987 | Cigna | 414/744 R |
| 4,720,231 | 1/1988 | Pienta | 414/560 |
| 4,735,539 | 4/1988 | Häkkinen et al. | 414/281 |
| 4,753,103 | 6/1988 | Braiun | 72/405 |
| 4,804,173 | 2/1989 | Pol et al. | 271/11 |

(List continued on next page.)

FOREIGN PATENT DOCUMENTS

| | | | |
|---|---|---|---|
| 110045 | 6/1984 | European Pat. Off. | 901/30 |
| 224931 | 6/1987 | European Pat. Off. | 414/223 |
| 3717957 | 12/1988 | Germany | 414/751 |
| 3804572 | 8/1989 | Germany . | |
| 225833 | 12/1984 | Japan | 414/744.1 |
| 2211170 | 6/1989 | United Kingdom | 901/30 |

*Primary Examiner*—James W. Keenan
*Attorney, Agent, or Firm*—Young & Basile, P.C.

[57] ABSTRACT

A production line which includes a shuttle conveyor extending between two work stations. A first transfer device for transferring a workpiece from one of the work stations to the conveyor and a second transfer device for transferring the workpiece to the second work station are equipped with workpiece gripping or supporting devices which may be rapidly changed when the line is shifted from the production of one form of workpiece to the production of another workpiece having a different configuration. Replacement workpiece gripping devices are supported adjacent the shuttle conveyor upon holding pedestals. Upon line changeover, the transfer devices locate their workpiece gripping devices upon empty holding pedestals and actuating devices on the pedestal release the gripping devices from their transfer devices. The empty transfer devices are then shifted and coupled to new workpiece gripping devices supported on other holding pedestals. The transfer device includes the ability for adjustment of the article engaging devices in three directions.

5 Claims, 10 Drawing Sheets

U.S. PATENT DOCUMENTS

| | | | |
|---|---|---|---|
| 4,828,306 | 5/1989 | Blatt | 294/64.2 |
| 4,842,476 | 6/1989 | Shiotani | 414/751 |
| 4,898,287 | 2/1990 | Blatt | 212/177 |
| 4,905,850 | 3/1990 | Blatt | 212/177 |
| 4,921,387 | 5/1990 | Bennington | 414/225 |
| 4,941,793 | 7/1990 | Shiraishi et al. | 414/225 |
| 4,988,261 | 1/1991 | Blatt | 414/749 |
| 4,993,139 | 2/1991 | Burry et al. | 901/41 X |
| 4,995,505 | 2/1991 | Takahashi et al. | 198/468.4 |
| 4,996,753 | 3/1991 | Jones | 901/41 X |
| 5,000,654 | 3/1991 | Shiotani | 414/751 |
| 5,006,028 | 4/1991 | Jackson | 414/222 |
| 5,018,266 | 5/1991 | Hutchinson et al. | 901/41 X |
| 5,028,195 | 7/1991 | Ishii | 414/222 |
| 5,035,566 | 7/1991 | Sartorio et al. | 901/41 X |
| 5,035,568 | 7/1991 | Joulin | 414/752 |
| 5,044,063 | 9/1991 | Voellmer | 901/30 X |
| 5,046,916 | 9/1991 | Sörensen | 414/751 |
| 5,051,055 | 9/1991 | Blatt et al. | 414/626 |
| 5,087,169 | 2/1992 | Tübke | 414/792.9 |
| 5,129,777 | 7/1992 | Pohjonen et al. | 414/280 |
| 5,148,697 | 9/1992 | Shiraishi et al. | 414/752 X |
| 5,174,709 | 12/1992 | Blatt et al. | 414/567 |
| 5,215,181 | 6/1993 | Blatt | 198/468.2 |
| 5,222,854 | 6/1993 | Blatt et al. | 414/225 |
| 5,376,062 | 12/1994 | Zeichner | 901/41 X |

AUTOMATIC TOOL CHANGER

RELATED APPLICATIONS

This application is a division of Ser. No. 034565 filed Mar. 19, 1993 now U.S. Pat. No. 5,452,981 issued on Sep. 26, 1995 which is a continuation-in-part of application Ser. No. 07/756,492 filed on Sep. 9, 1991, now U.S. Pat. No. 5,222,854, and application Ser. No. 07/978,134 filed on Nov. 18, 1992, abandoned, which is a divisional application of application Ser. No. 07/665,029 filed on Mar. 6, 1991 and now U.S. Pat. No. 5,174,709. U.S. Pat. No. 5,174,709 is incorporated herein by reference.

FIELD OF THE INVENTION

The present invention generally relates to article transfer devices and, more particularly, is related to workpiece transfer devices of the type used to transfer workpieces from one work station to another in an automated production line.

BACKGROUND OF THE INVENTION

The present invention is directed to an automatic tool changer primarily intended for use with workpiece handling apparatus employed to transfer sheet metal panels from one work station to the next in a production line where the line is changed over from time to time from producing panels of one configuration to producing panels of a different configuration.

Sheet metal automobile body panels are typically formed by passing the sheet metal blank through a series of stamping dies which progressively transform the original flat rectangular sheet metal blank into the desired final panel configuration. The presses in which the dies are mounted are massive machines. The capital investment required to set up a single stamping production line is such that the line cannot be dedicated to the production of only a single type of panel. Conversion of the line from the production of one type of body panel to another requires not only the changing of the dies in the various presses, but also will require, for reasons to be explained below, changes to panel gripping and handling devices employed to transfer the panels from one press to the next.

In the past, the standard practice was to operate the line on relatively long production runs—that is to produce a relatively large number of panels of one type before changing the line over to produce panels of a different type. This procedure required a substantial amount of storage space to store the panels. A production run on the stamping line might, for example, produce enough panels to supply the assembly line for ten days. The rate at which the panels could be produced by the stamping line was substantially higher than the rate at which the panels were required at the assembly line, hence the time constraints on changing the line over from one panel to another were quite generous.

At present, however, the preferred procedure is the so-called "just-in-time" production system in which the storing of large numbers of panels in inventory is substantially eliminated. Practice of the "just-in-time" procedure dictates relatively short production runs with rapid changeover of the stamping line from one panel to another being required.

As noted above, the changeover of the stamping line from the production of one type of panel to the production of a different panel requires not only the changing of the dies in the presses, but also almost invariably requires the changing of the panel engaging elements of the article handling system employed to transfer the panels from one press to the next.

Typically, the panels are moved into and out of the presses by a group of vacuum cups mounted upon a frame to grip the upper surface of a generally horizontally disposed panel to stably support the panel so that it can be lifted by the frame from one location, transported horizontally and then lowered and released at another location. Because the size and configuration of the panels can vary considerably from one type of panel to another, the number and location of the vacuum cups on their carrying frame must be conformed to the shape of the particular panel which is to be handled. Typically, the distance between adjacent presses is such that a handling device employed to manipulate the vacuum cup carrying frame to extract a panel from one press cannot conveniently be employed to load the extracted panel into the next press. The most common arrangement finds a vacuum cup carrying frame being manipulated by a take-out device to extract the panel from the first press and to load the panel upon a panel receiving "nest" on a transfer conveyor which then conveys the panel to a location adjacent the next press where a second vacuum cup carrying frame is manipulated by a loading device to remove the panel from the transfer conveyor nest and load it into the second press.

In this system, three panel supporting devices are required—two vacuum cup carrying frames, one for each of the take-out and loading devices, and a third panel supporting device or nest for supporting the panel upon the transfer conveyor.

The present invention is especially directed to systems which enable a rapid and largely automated change of the panel engaging devices of such a transfer system.

SUMMARY OF THE INVENTION

The present invention provides for a workpiece transfer apparatus that is capable of independently transferring a workpiece from a first work station to a second work station without the use of intermediate transfer devices and, as in the preferred embodiment, is capable of implementation in tandem and other multiplicities for handling multiple workpieces simultaneously.

The article transfer device generally includes first and second bridge structures extending between a first work station and a second work station carrying independently operable power lift devices. First and second shuttle track assemblies are fastened to and carried individually by the lift devices. First and second shuttle units are carried individually by the first and second shuttle track assemblies respectively and are movable from one end of the shuttle track assembly to the other. Third and fourth shuttle track assemblies are carried individually by the first and second shuttle units and are movable horizontally with respect to the shuttle units, as shown in Applicants' U.S. Pat. No. 5,174,709. A vacuum cup carrying unit is carried by the third and fourth shuttle track assemblies, as also shown in Applicants' U.S. Pat. No. 5,174,709, and is movable along the third and fourth shuttle track assemblies for engaging and carrying an article from a first location to a second location. The second shuttle track includes integral rolling tracks located at points of contact of the shuttle tracks for providing simultaneous movement of the second shuttle track with respect to the first shuttle unit and of the second shuttle track with respect to the vacuum cup carrying unit. The fourth shuttle track mirrors the second shuttle track and includes similar means for providing simultaneous movement of the fourth shuttle track with respect to the second shuttle unit and of the fourth shuttle track with respect to the vacuum cup carrying unit.

The bridge structures each include a power shuttle track for providing displacement of each of the first and second bridge structures in two directions.

The vacuum cup carrying unit includes a programmable carrier with alternatively useable first and second workpiece gripper sets each respectively adapted to releasably grip and carry an article of a first configuration and an article of a second configuration. The gripper sets each include a generally horizontal frame member and supports on the holders engageable with location means on the frame member for stably supporting the grippers on the holders and restraining the grippers against horizontal movement relative to the holders.

The present invention further utilizes an automatic tool changer for changing various article carrying devices to adapt to varying parts.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
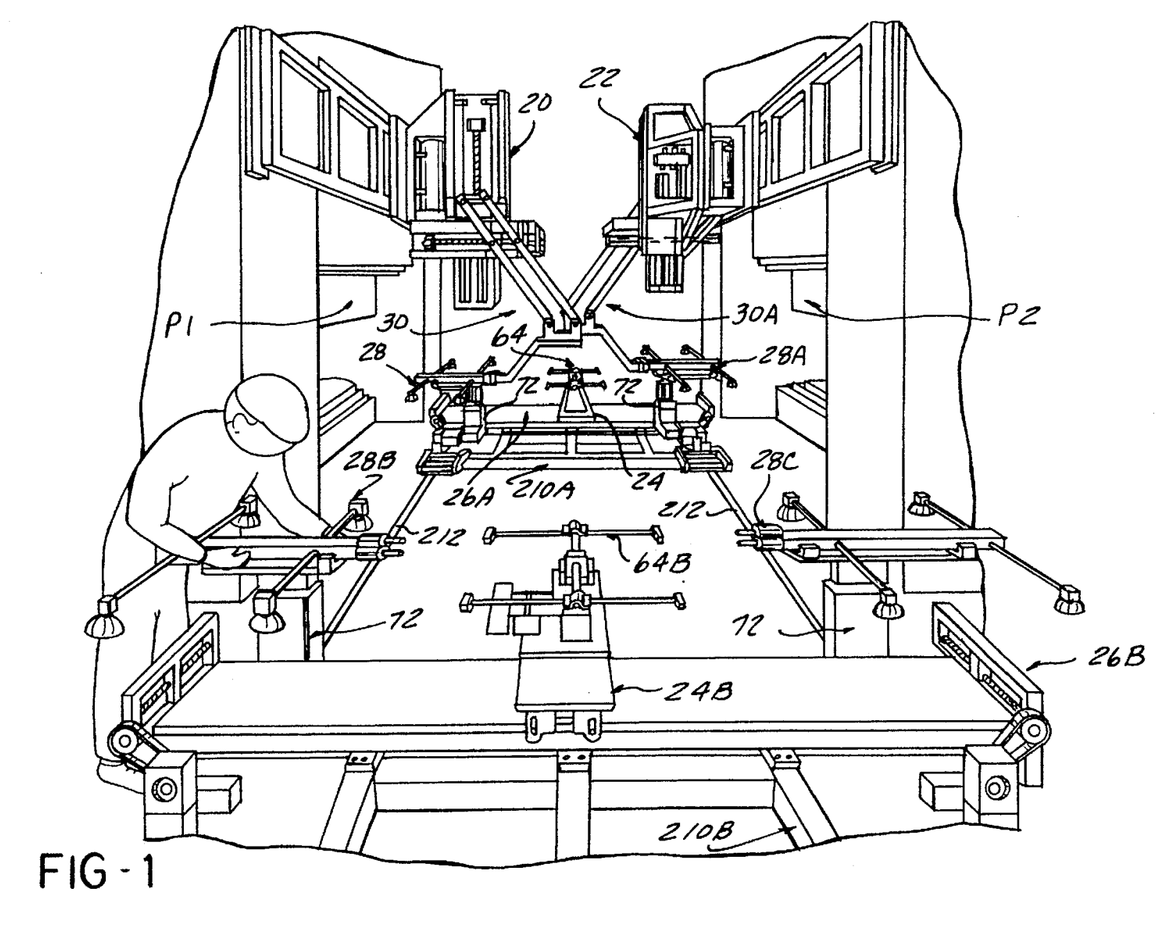
FIG. 1 is a simplified schematic perspective view of one form of workpiece handling apparatus embodying the present invention, with certain parts broken away or omitted.
Figure 3:
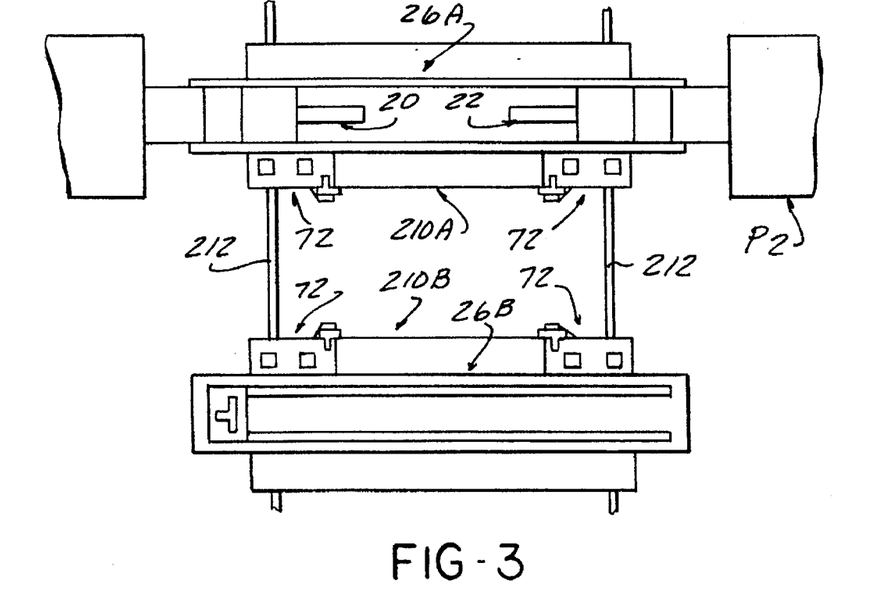
FIG. 3 is a simplified top plan view of the apparatus of FIG. 1.

One form of workpiece handling apparatus embodying the present invention is schematically illustrated in FIGS. 1 and 3 in an application where the apparatus transfers sheet metal workpieces from a first stamping press P1 to a second press P2. The major components of the system include two like press loader/unloader units or transfer devices designated generally 20, 22 which are mounted at fixed positions relative to the respective presses P1 and P2. Transfer devices 20 and 22 are known in the art and are commercially available from ISI Robotics, Fraser, Mich.

Figure 2:
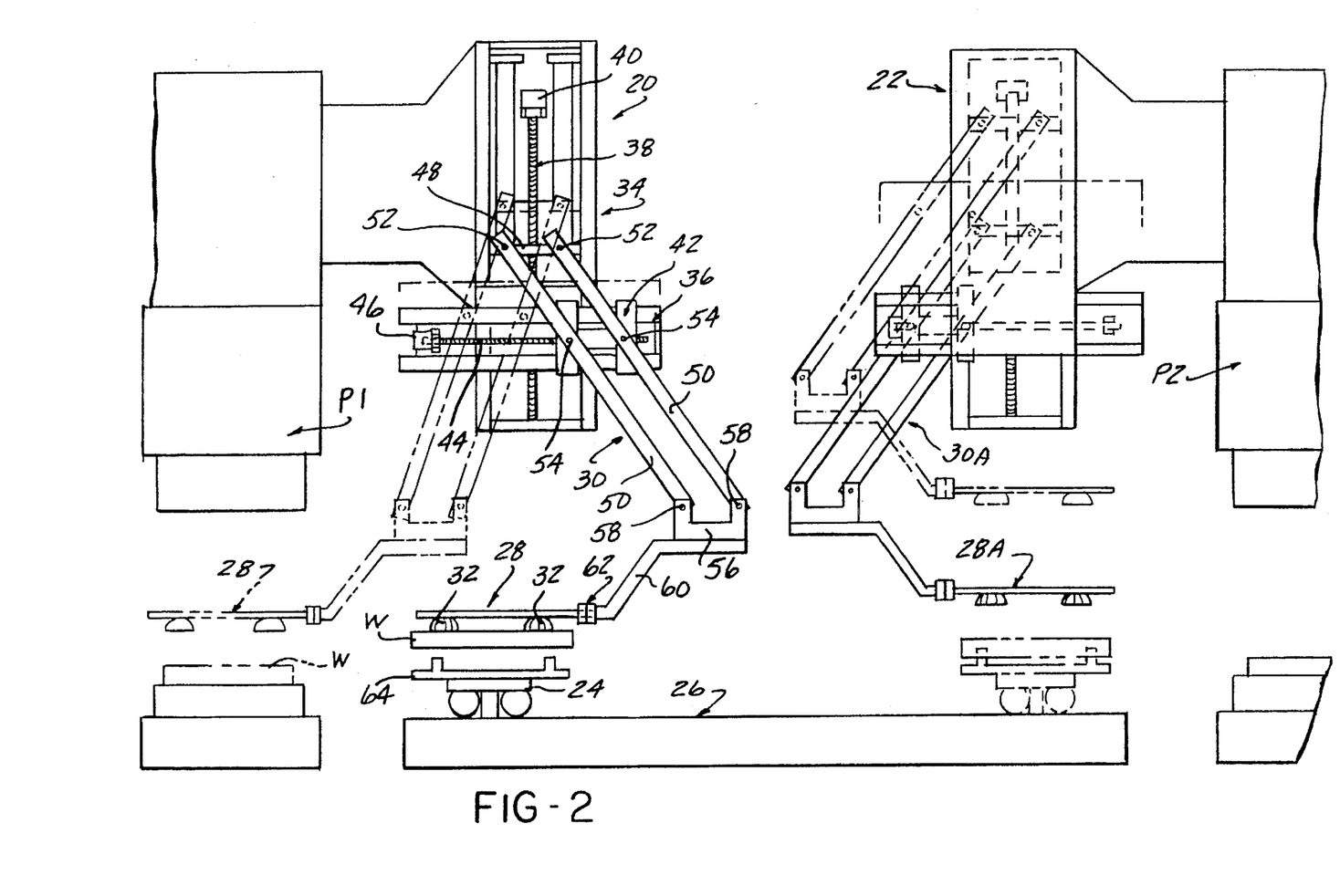
FIG. 2 is a simplified schematic side elevational view of the apparatus of FIG. 1.

As best indicated in FIG. 2, transfer device 20 functions as a press unloader to transfer a workpiece W from press P1 to the shuttle carriage 24 of a shuttle conveyor designated generally 26. In FIG. 2, shuttle carriage 24 is shown in what will be referred to as a receiving position adjacent the left-hand end of conveyor 26 and is about to receive a workpiece W carried by a vacuum cup carrying frame designated generally 28 which is in turn carried by a carrier means in the form of a parallelogram linkage designated generally 30 which constitutes an operating part of the transfer device 20. The workpiece W is held upon frame 28 by vacuum cups 32, of well-known construction, see, for example, U.S. Pat. No. 4,828,306.

Once deposited upon carriage 24 by the release of the vacuum from cup 32, the workpiece W is conveyed by carriage 24 to the opposite or discharge end of shuttle conveyor 26, from which the workpiece W is transferred by a vacuum cup carrying frame 28A carried by a parallelogram linkage 30A of transfer device 22 from shuttle carriage 24 into the opened press P2.

The two transfer devices 20 and 22 are of identical construction, and the following general description of the device 20 is equally applicable to transfer device 22, corresponding reference numerals with the subscript A identifying the parts of device 22. Referring particularly to FIG. 2, transfer device 20 includes a fixed frame 34 which, in the embodiment of FIGS. 1–3, is fixedly mounted upon a fixed framework which may take the form of the frame of the press P1, for example. A vertically movable lift frame 36 is mounted upon fixed frame 34 for guided vertical movement relative to frame 34. A vertical drive or lift screw 38 rotatably mounted on fixed frame 34 is threadably received by a suitable nut means (not shown) mounted on lift frame 36, screw 38 being driven in rotation by a reversible drive motor 40 mounted on fixed frame 34. A slide frame 42 is mounted for horizontal sliding movement upon lift frame 36 under the control of a second drive screw 44 rotatably mounted upon frame 36 and threadably received in a nut means (not shown) in slide frame 42. A reversible drive motor 46 is employed to rotate screw 44.

A horizontal bar 48, constituting a portion of the parallelogram linkage 30, is mounted upon fixed frame 34 for guided vertical movement relative to frame 34. The two main links 50 of parallelogram linkage 30 are pivotally mounted at their upper ends at the opposite ends of bar 48 as by pivots 52. At a location intermediate their ends, links 50 are mounted at horizontally spaced locations on slide 42 as by pivots 54, while the lower ends of links 50 are coupled to a mounting link 56 as by pivots 58. A carrier boom 60 of the type shown in U.S. Pat. Nos. 4,898,287 and 4,905,850 is fixedly mounted to mounting link 56, and the vacuum cup carrying frame 28 is detachably coupled to boom 60 by a quick disconnect coupling designated generally 62. As will be described in greater detail below, coupling 62 includes mating components on boom 60 and on frame 28.

Drive motors 40 and 46 are controlled by a programmable control unit (not shown, but known in the art) which may be programmed to coordinate the operation of drive motors 40 and 46 to cause the vacuum cup carrying frame 28 to move along a preselected path. Operation of drive motor 40 bodily raises or lowers the parallelogram linkage 30 and its attached boom 60 vertically, but does not impart any horizontal motion to boom 60. Operation of the horizontal drive motor 46 shifts pivots 54 of linkage 36 horizontally, and this horizontal motion of pivots 54 induces motion of boom 60 which has both horizontal and vertical components of motion due to the fact that the pivots 58 at the lower ends of main links 50 must move in circular arcs centered on the associated pivot 54. The upper ends of links 50 are constrained against any horizontal movement by the bar 44, which can move freely vertically relative to fixed frame 34 as required by movement of the horizontal slide 42. As stated above, transfer devices 20 and 22 are commercially available devices known in this art.

Similarly, many types of shuttle conveyors 26 suitable for use in systems of this type are commercially available. See, for example, the shuttle conveyor, shuttle carriage and work holder platform described in U.S. Pat. No. 4,988,261, whose disclosure is incorporated by reference. The conveyor 26 includes a drive (not shown) coupled to carriage 24 which is operable to drive carriage 24 in movement between the two end positions indicated in FIG. 2. The workpiece W is supported upon shuttle carriage 24 by a so-called "nest" 64 which is detachably mounted upon the carriage 24 by any suitable mechanical arrangement which will accommodate a reasonably quick manual mounting or dismounting of a nest 64 upon carriage 24. Where the system is set up to handle sheet metal body panels of complex shape, such as that of the body panel BP of FIG. 6, for example, the underside of the body panel may be employed to form a mold for forming a nest for conveying panels of that particular configuration. The panel simply rests upon or in the nest while being transferred on the shuttle conveyor. Because the panel is held in position simply by gravity, it is not necessary to supply air under pressure or electrical power to the nest to actuate holding devices. Hence the mechanical structure for attaching a nest to a carriage 24 may simply take the form of one or more vertical locating pins (not shown) on the nest or carriage received in a vertical locating bore in the carriage or nest with the pin being releasably retained in the bore as by a spring-loaded detent, or releasable latch, or rotary cam lock. For present purposes, it may be assumed that the nest is manually mounted upon or dismounted from carriage 24. See, for example, Patent No. 4,988,261 for a disclosure of a shuttle conveyor, shuttle carriage and a work holder platform detachably mounted upon the carriage.

Figure 6:
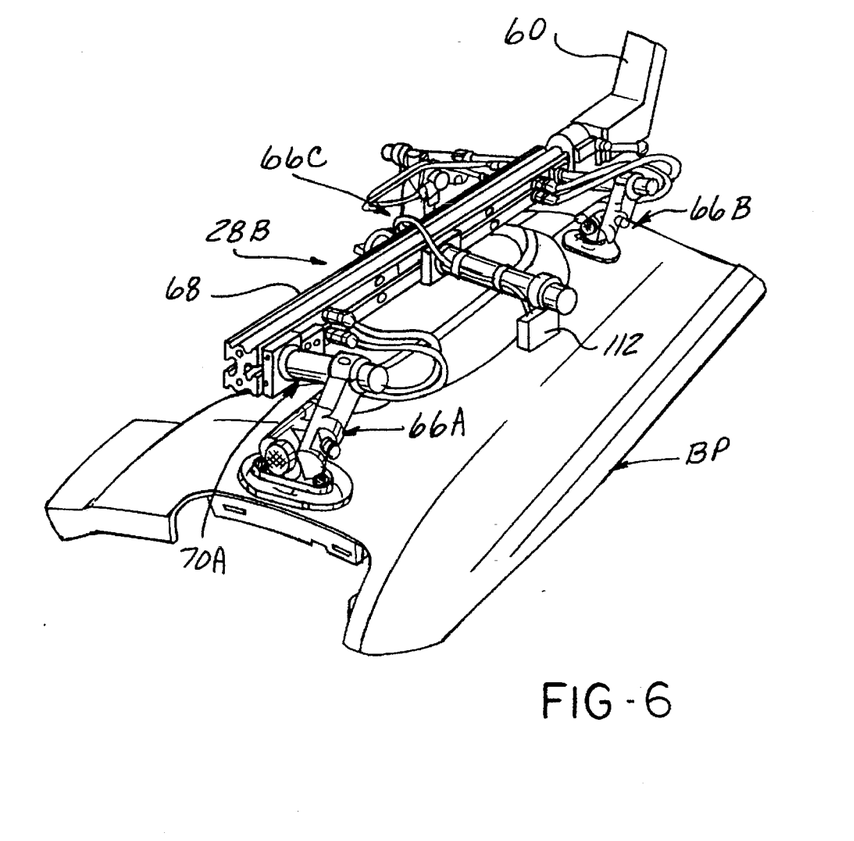
FIG. 6 is a perspective view of a typical vacuum cup carrying frame of the present invention engaged with a typical workpiece panel.

As stated above, present-day practice in the automotive industry is to operate stamping plant production lines to supply body panels to the vehicle assembly line under a "just-in-time" schedule. This results in frequent changeovers of the stamping plant lines from the production of one type of body panel to the production of another, and the present invention is directed to apparatus specially designed to enable the workpiece handling units to be rapidly and efficiently changed over from the handling of one type of body panel to the handling of another. Referring briefly to FIG. 6, the body panel BP there shown is a left rear quarter panel shown being gripped by a vacuum cup carrying frame 28B having three vacuum cup assemblies 66A, 66B, 66C located to grip the panel at three separated points to stably support the panel. Other body panels of different configuration—a right front fender, for example—might require a different number and arrangement of vacuum cups. A nest 64 on the shuttle conveyor carriage conformed to support and fixedly locate the panel BP of FIG. 6 would not support a front fender panel.

In the past, referring to FIG. 6, the vacuum cup assemblies 66A, 66B and 66C have been mounted upon a main frame member 68 by mounting arrangements such as 70A which accommodate a fairly wide range of adjustment of the position of the vacuum cup assembly 66A relative to the main frame member. When the time comes to change the cup carrying frame 28B from conforming to one type of body panel to conforming to another, this adjustment capability of the vacuum cup position has been utilized to relocate the vacuum cups as required, this adjustment being performed while the main frame member 68 remains coupled to the transfer device boom 60.

A more rapid changeover, however, may be accomplished in accordance with the present invention by providing a series of vacuum cup carrying frames, each conformed and dedicated to the handling of a single type of body panel. The quick disconnect devices for coupling any selected one of these vacuum cup frames to the transfer device boom 60 such as those disclosed in U.S. Pat. Nos. 4,898,287 and 4,905,850 present the possibility of accomplishing a rapid automated changeover. In such a changeover, a vacuum cup carrying frame such as 28 or 28B conformed to one type of body panel is automatically dismounted from the transfer device boom 60 and replaced by a different vacuum cup carrying frame conformed to handle a different panel configuration.

Figure 10:
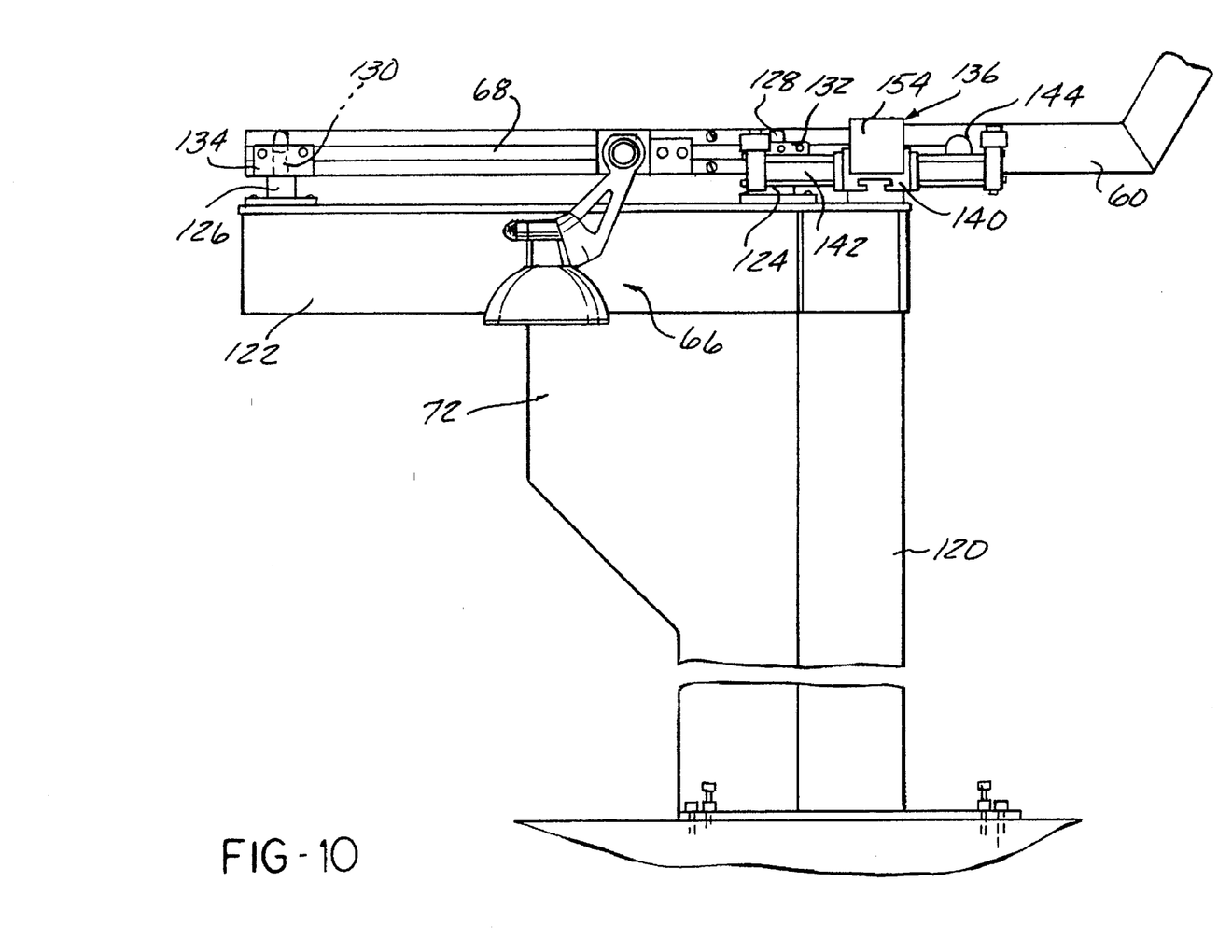
FIG. 10 is a side elevational view of a holding pedestal supporting a vacuum cup carrying frame with certain parts broken away or omitted.
Figure 11:
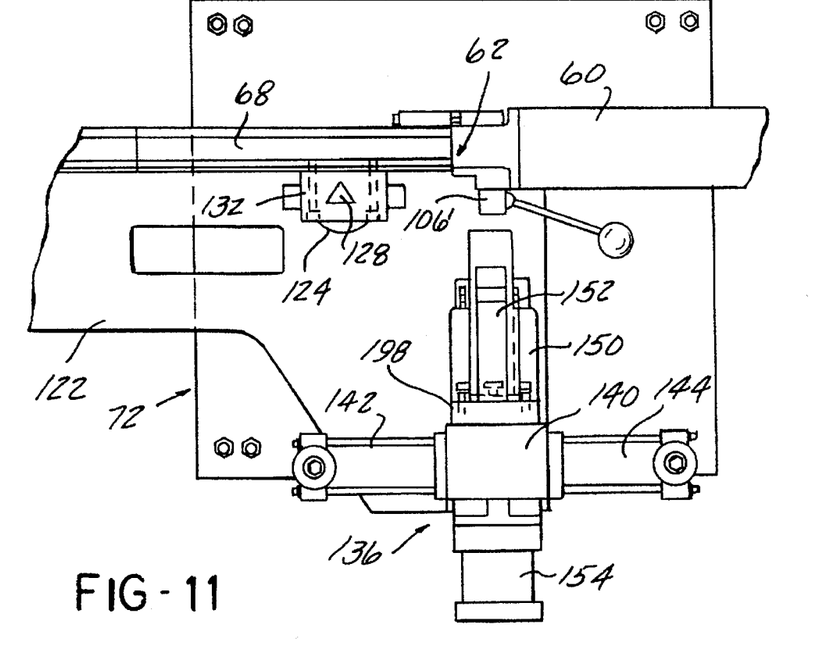
FIG. 11 is a top plan view of the apparatus shown in FIG. 10, again with certain parts broken away or omitted.
Figure 12:
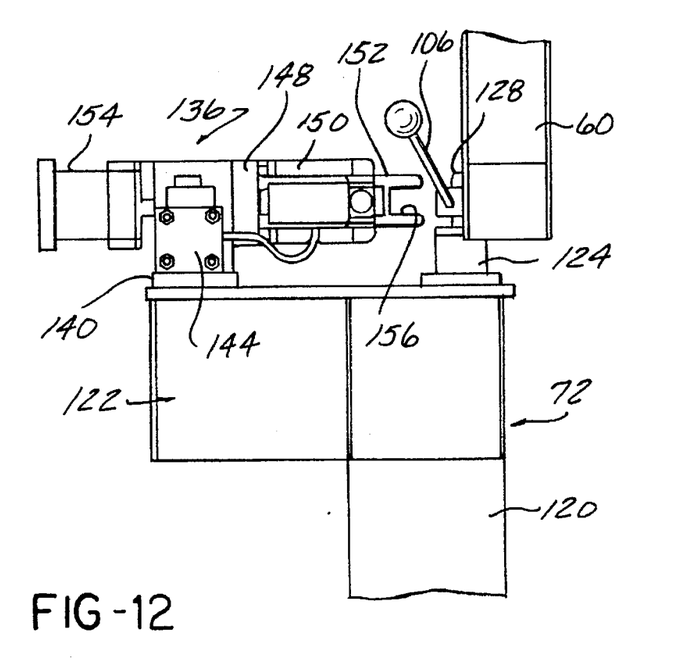
FIG. 12 is a front end view of the structure shown in FIGS. 10 and 11, again with certain parts broken away or omitted.

In order to accomplish this, in addition to the major system components discussed above, a group of holding pedestals 72 (FIG. 3) are employed. The structural details of pedestals 72 are best shown in FIGS. 10–12, and will be described in greater detail below. In general terms, the function of holding a pedestal is to support a vacuum cup carrying frame 28, etc. in a ready position to be coupled to a transfer boom 60 or to receive a vacuum cup carrying frame 28 being taken out of service from the boom 60. The structure, function and operation of the holding pedestals 72 is best understood by first considering the structure of the vacuum cup carrying frames, such as schematically indicated at 28, 28A in FIGS. 1 and 2 and shown in somewhat greater structural detail in FIG. 6, with further details of the quick disconnect coupling 62 shown in FIG. 9.

Figures 8, 9:
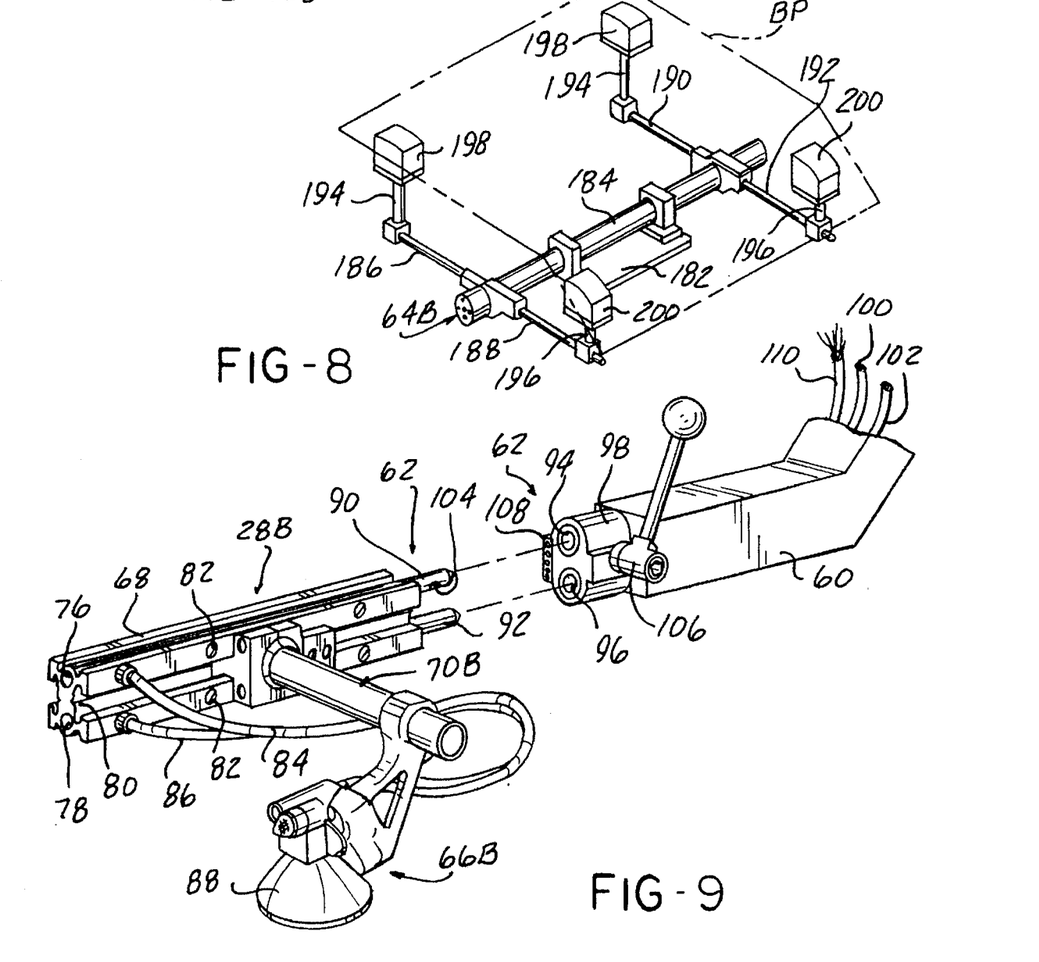
FIG. 8 is a perspective view of an alternative type of workpiece supporting nest.
FIG. 9 is a perspective view, with certain parts broken away, showing details of the quick disconnect device employed.

Referring to FIG. 9, a vacuum cup carrying frame such as 28B includes a main frame member 68 which preferably is formed as an aluminum extrusion having a pair of longitudinally extending through passages 76, 78 and longitudinally extending undercut T slots such as 80 formed in both of its opposite sides. At longitudinally spaced positions along main frame member 68, tapped bores 82 extend inwardly from opposite sides of the frame member to open into the bores 76, 78. These tapped bores are normally plugged as by a threaded set screw; by unplugging selected bores and connecting flexible hoses such as 84, 86, the passages 76 and 78 may be placed in fluid communication with a vacuum cup assembly such as 66B. Vacuum cup assembly 66B may, for example, take the form of the vacuum cup housing and controls disclosed in U.S. Pat. No. 4,828,306, whose disclosure is incorporated herein by reference.

At one end of main frame 68, hollow tubular pins 90, 92 are fixedly and sealingly mounted on the end of frame member 68 to project longitudinally from the frame member, the pins 90 and 92 having longitudinal through passages (not shown) which communicate respectively with the passages 76, 78 in frame member 68. The opposite ends of passages 76, 78 are plugged. Tubular pins 90, 92 are spaced from each other to be slidably and sealingly received within bores 94, 96 formed in a fitting 98 fixedly secured to the end of boom 60. The bores 94, 96 through fitting 98 are in fluid communication with a pair of flexible hoses 100, 102 which may be connected, as shown in U.S. Pat. No. 4,828,306 to a four-way reversing valve to conduct air under pressure to or from the passages 76, 78 in frame member 68. As explained in greater detail in U.S. Pat. Nos. 4,898,287 and 4,905,850, when the tubular pins 90 and 92 on frame member 68 are fully seated in the bores 94, 96 on fitting 98 of boom 60, in addition to functioning as a fluid pressure coupling, pin 90 is formed with a concave recess 104 which cooperates with a cam (not shown) on a rotatable cam member 106 which may be rotated to one position clear of recess 104 so that pins 90 and 92 can be freely inserted into or withdrawn from bores 94, 96 or rotatably positioned in a locking position in which a cam is seated within recess 104 to mechanically lock and prevent the withdrawal of pin 90 from its bore 94. This rotary locking arrangement, as described in greater detail in U.S. Pat. Nos. 4,898,287 and 4,905,850 mechanically locks the vacuum cup carrying frame 28B to boom 60.

As also explained in U.S. Pat. Nos. 4,898,287 and 4,905,850, the fitting 98 on boom 60 may also carry one element 108 of a multi-pin electrical connector which, when pins 90 and 92 are fully seated in bores 94, 96, likewise receives the pins of a mating electrical conductor fixedly mounted on that side of frame member 68 remote from the observer in FIG. 9 to electrically connect the individual electrical wires of a multi-conductor electrical cable 110 which passes through boom 60 to be electrically connected to connector element 108. Referring to FIG. 6, a vacuum cup carrying frame such as the frame 28B may carry an electronic proximity sensor such as 112 which transmits an electrical signal via the conductors of cable 110 to the control system of the apparatus to signal that the clamp carrying frame is close enough to a body panel so that the vacuum cups are in contact with the body panel and can be evacuated to grip the panel. The proximity switch 112 will also signal the control circuit that a body panel has in fact been released as the clamping frame moves away from the panel.

In FIGS. 10–12, the main frame member 68 of a clamping frame is shown supported upon a holding pedestal 72 and engaged with the end of a boom 60. For purposes of clarity, with the exception of a single vacuum cup assembly 66 in FIG. 10, the main frame member 68 of FIGS. 10–12 is shown with the various vacuum cup assemblies removed in order to more clearly illustrate the cooperating structure between the clamping frame member 68 and holding pedestal 72.

Each holding pedestal 72 includes a generally vertical post-like support frame member 120 having a suitably shaped table-like platform 122 fixedly mounted at its upper end. Locating pin carrying bases 124, 126 are in turn fixedly mounted upon platform 122, the locking pin carrying base 124 having a fixedly mounted locking pin 128 (FIGS. 11 and 12) fixedly secured to and projecting upwardly from the base, while a second locking pin 130 (FIG. 10) is fixedly mounted upon and projects upwardly from the pin carrying base 126. Pin receiving blocks 132, 134 are fixedly mounted upon one side of main frame member 68 and formed with locating pin receiving bores or vertical passages conformed to slidably receive the locating pins. Preferably, the pins 128 and 130 and their associated pin receiving passages in blocks 132, 134 are of different transverse cross-sections (pin 128 is shown with a triangular cross-section in FIG. 11) to assure proper orientation of frame member 68 relative to the platform so that the tubular pins 90 (FIG. 9) at one end of frame member 68 will face the path of movement of boom 60 for coupling and uncoupling purposes.

The main frame member 68 of a clamping frame assembly may initially be manually loaded upon a holding pedestal 72 simply by lowering the main frame member to seat the locating pins 128, 130 on the holding pedestal within the pin receiving passages in the blocks 132, 134 fixedly mounted upon the main frame member 68 of the clamping frame. As best seen in FIGS. 10 and 12, main frame member 68 is supported from below by the respective bases 124, 126, and the engagement of the locating pins 28, 130 within the vertical passages in blocks 132, 134 holds frame member 68 against horizontal displacement relative to holding pedestal 72 in any direction.

When the main frame member 68 of a clamping frame is mounted upon a holding pedestal 72 as shown in FIGS. 10–12, the boom 60 of a transfer unit may be shifted horizontally toward and away from the right-hand end of frame member 68 as viewed in FIGS. 10 and 11 to engage or disengage the tubular pins 90, 92 on frame member 68 within the pin receiving bores 94, 96 on boom 60. This insertion and removal of the pins 90, 92 into and out of bores 94, 96 requires that the rotary cam locking member 106 be in a release position which accommodates this relative movement of pins 90, 92 relative to the coupling element 98. Holding pedestals 72 are provided with an actuating device designated generally 136 which is operable, when the quick disconnect coupling 62 on boom 60 and frame member 68 are engaged with each other, to rotate the rotary cam member 106 to selectively mechanically lock or unlock the quick disconnect coupling 62. As stated above, the coupling 62 is disclosed in detail in U.S. Pat. Nos. 4,898,287 and 4,905,850 to which reference may be had for further details of the coupling.

Actuating device 136 is a commercially available unit originally developed as a gripper head rotating device. The rotating unit includes a main body or housing 140 which is fixedly mounted upon platform 122. A pair of pneumatic cylinders 142, 144 are mounted upon opposite sides of body 140 and project from the body in longitudinal coaxial alignment with each other. Each of cylinders 142, 144 carries a piston and the facing sides of the pistons are fixedly secured to the opposite ends of an elongate rack (not shown) meshed with a pinion (not shown) which is operatively mounted for rotation about a fixed axis within body 140. Actuation of the pistons to simultaneously drive them in one direction will rotate the pinion within body 140 in one direction, driving of the pistons within the cylinders 142, 144 in the opposite direction will rotate the pinion in the opposite direction.

Referring now to FIGS. 11 and 12, the pinion referred to above is fixedly secured to a mounting member 148 mounted at the exterior of body 140. Mounting member 148 is rotatable relative to body 140 with the above referred-to pinion. An actuator member housing 150 is fixedly mounted on mounting member 148 for rotation with the mounting member and carries an elongate actuating rod 152 which is received within housing 150 for axial sliding movement relative to the housing while being rotatably locked to the housing for rotation with the housing, mounting plate 148 and piston.

At that side of body 140 opposite mounting member 148, the cylinder 154 of a pneumatic motor is fixedly mounted to body 140. A piston (not shown) is operatively mounted within cylinder 154, and a piston rod fixed to this latter piston projects from cylinder 154 through a central bore passing through the pinion within body 140 and the distal end of this piston rod is coupled to actuating member 152 to drive member 152 in axial reciprocation within housing 150 in response to actuation of the piston carried within cylinder 154.

As stated above, such devices are commercially available and well-known in the art. Essentially the actuating device 136 carries actuating rod 152 within housing 140 for axial reciprocation and for rotation about its axis. As best seen in FIG. 12, the distal end of actuating member 152 is forked as at 156, this fork being operable when member 152 is advanced to the right from the position shown in FIG. 12, to rotatively couple actuating member 152 to the rotary cam 106 utilized to lock or unlock the quick disconnect coupling 62 between boom 60 and main frame member 68. Operation of the various pneumatic motors which incorporate the cylinders 142, 144 and 154 is under the control of the master control system of the transfer unit.

Figure 7:
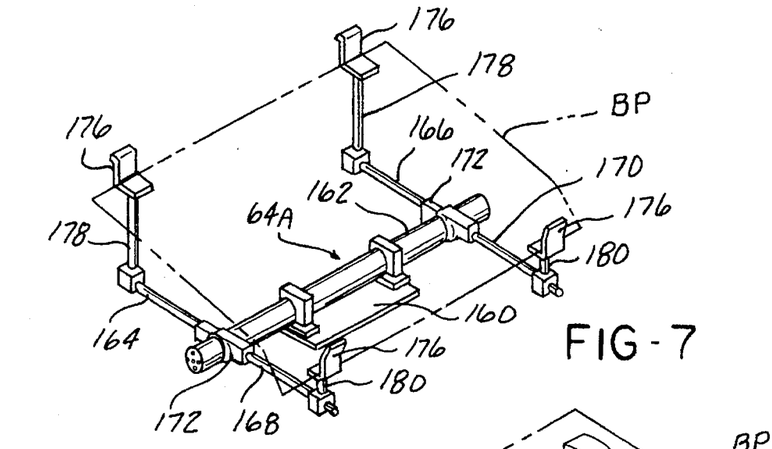
FIG. 7 is a perspective view showing one general type of workpiece receiving nest employed on shuttle conveyors utilized in the present invention.

In FIGS. 7 and 8, two forms of workpiece carrying nests 64A, 64B utilized to support workpieces upon the shuttle carriage 24 of shuttle conveyor 26 are shown. The nests, in use, simply support the workpiece or body panel from beneath while engaging the body panel in some fashion to prevent horizontal displacement of the panel relative to the nest. The panel is retained in position on the nest simply by gravity, hence it is not necessary to utilize releasable clamp or vacuum cups on the nest to retain the workpiece or body panel, thus eliminating the requirement of connecting an air pressure supply line or an electrical power cable to a shuttle carriage which must move along a path of fairly substantial length.

In the past, where the workpieces being handled were automotive body panels, a nest for supporting the panel upon a shuttle carriage typically was constructed by utilizing the underside of a body panel as a mold to form a fiberglass sheet into a surface complementary to the undersurface of the body panel. The formed fiberglass sheet was then attached to a metal mounting bracket having a quick disconnect mechanical coupling device for mounting and dismounting the nest upon the shuttle carriage. While such molded nests provided for accurate positioning of the panel upon the shuttle carriage, where larger panels were involved, the weight of the fiberglass nest became substantial and manual mounting and dismounting the nests upon the shuttle carriage became a two-man job.

In FIGS. 7 and 8, two forms of light-weight nest assemblies are disclosed. The type of nest shown in FIG. 7 will be referred to as an edge gauge nest which, as shown in FIG. 7, is constructed to engage the body panel at various spaced locations along its peripheral edge. The nest 64A is made up of a platform 160 upon which is fixedly mounted a main frame member 162. Branch-like arms such as arms 164, 166, 168 and 170 may be fixedly secured as by brackets 172 to main frame member 162 and edge engaging brackets 176 may be mounted on the various arms as by posts such as 178, 180. Because this arrangement supports the body panel only from spaced locations along its peripheral edge, this type of nest is perhaps best adapted for panels which are relatively inflexible.

In FIG. 8, a contour gauge nest is shown which includes a main platform 182, main frame member 184, arms such as 186, 188, 190, 192 and posts 194, 196, assembled into a relatively light-weight open framework in the same manner as the platform, frame member, arms and posts of the FIG. 7 nest were assembled. In the FIG. 8 arrangement, however, at the upper end of the posts 194, 196, molded pads 198, 200, conformed to localized regions on the underside of the body panel are employed to support the panel upon the nest. Pads 198, 200 typically may be formed of a urethane or fiberglass material. One or more of the pads may be provided with a vertically projecting locating pin (not shown) received within a locating hole in the body panel BP, or the pads may project into a recess in the body panel BP to retain the panel against horizontal shifting movement relative to the nest.

The platforms 160, 182 typically will be provided with a downwardly projecting mounting pin (not shown) receivable in a manually actuated cam locking device, not shown, on the shuttle carriage 24. See U.S. Pat. No. 4,988,261 for a typical quick disconnect coupling for mounting nests of this type upon a shuttle carriage.

The nests 64A, 64B may be mounted and dismounted upon a shuttle carriage 24 manually.

Referring now to FIGS. 1–5, one form of changeover system embodying the present invention is shown in FIGS. 1–3 as including (FIGS. 1 and 3) two alternatively usable shuttle conveyors 26A, 26B, the conveyor 26A being shown in FIGS. 1 and 3 operatively positioned in alignment with the presses P1 and P2 and the transfer devices 20 and 22, which in this particular embodiment are mounted at respective fixed locations. Shuttle conveyors 26A and 26B are mounted on respective platforms 210A, 210B which in turn are mounted for movement along a pair of tracks 212. In addition to supporting a shuttle conveyor, each of the platforms 210A and 210B also fixedly support two holding pedestals 72, the pedestals 72 on each platform being located at one side of the shuttle conveyor adjacent each end of the shuttle conveyor.

Referring now particularly to FIG. 1, the shuttle carriage 24 of conveyor 26A is shown with its nest 64 empty and the shuttle carriage 24 located midway between the ends of the conveyor 26A. A vacuum cup carrying frame 28 is mounted on the boom of transfer device 20 and a second vacuum cup carrying frame 28A is mounted upon the boom of the second transfer device 22. For purposes of explanation, none of the vacuum cup carrying frames 28, 28A or nest 64 is shown supporting a workpiece. As explained above, in an operative cycle upon the opening of press P1, transfer device 20 would shift its vacuum cup carrying frame 28 into the press P1 to grip the panel, lift the panel clear of the press die and convey the panel out of the press. At this time, shuttle carriage 24 would be located at the left-hand end of conveyor 26A as viewed in FIG. 1, and transfer device 20 and the control system would actuate the vacuum cup carrying frame 28 to deposit the panel upon nest 64, release the vacuum cups, and lift frame 28 clear of the deposited panel. Shuttle carriage 24 would then be driven to drive carriage 24 to the right to the right-hand end of shuttle conveyor 26A, at which time the vacuum cup carrying frame 28A at that end would be moved by transfer device 22 into engagement with the panel supported upon nest 64. Transfer device 22 would then cause frame 28A to lift the panel from the nest, advance it horizontally to the right as viewed in FIG. 1 into the open press P2 and to deposit the panel upon the die within press P2. Vacuum cup carrying frame 28A would then be released from the panel and withdrawn from the press. The cycle of operation would be repeated until the line including presses P1 and P2 is changed over to operate on workpieces or body panels of a different configuration.

In preparation for this changeover, a nest 64B would be manually mounted, as shown in FIG. 1, upon the carriage 24B of shuttle conveyor 26B, the nest 64B being conformed to the shape of the workpiece panel which is about to be placed in production. Vacuum cup carrying frames 28B and 28C would be manually loaded upon the holding pedestals 72 mounted on platform 210B. Referring particularly to FIGS. 1 and 3, the first step in accomplishing the actual changeover of the tooling involves the shifting of platform 210A away from the observer as viewed in FIG. 1 until the holding pedestals 72 on platform 210A are operatively aligned with the vertical general plane of movement of the vacuum cup carrying frames 28, 28A at this time respectively mounted upon the booms 60, 60A of transfer units 20 and 22. The booms are then manipulated to deposit their cup carrying frames 28 and 28A upon the respective holding pedestals 72 of platform 210A by vertically lowering the cup carrying frames until the locating pins on the respective pedestals 72 are received within the locating bores or passages on the frames 28, 28A as described above. The actuating devices 136 (see FIGS. 10–12) are then actuated to release the cam locks 106 to enable the transfer devices 20, 22 to disconnect their respective booms 60, 60A from the vacuum cup carrying frames 28, 28A by horizontally withdrawing the booms from the frames which are held against horizontal movement by the holding pedestals.

Platform 210A is then moved along tracks 212 further away from the observer in FIG. 1, and platform 210B is advanced along tracks 212 toward the transfer devices 20, 22. Platform 210B is stopped when the vacuum cup carrying frames 28B and 28C on the holding devices 72 on platform 210B are in alignment with the vertical planes of movement of the booms of transfer devices 20 and 22. The transfer devices are then actuated to seat their respective booms in engagement with the vacuum cup carrying frames 28B and 28C, and the actuating devices 136 on the holding pedestals are then actuated to rotate the locking cams 106 to mechanically lock frames 28B and 28C to the booms of transfer units 20 and 22. The transfer units 20 and 22 are then actuated to raise the now-coupled frames 28B and 28C upwardly clear of their respective holding pedestals 72. Platform 210B is then actuated to move forwardly until its shuttle conveyor 26B is operatively aligned with transfer devices 20 and 22 and presses P1 and P2.

Figure 4:
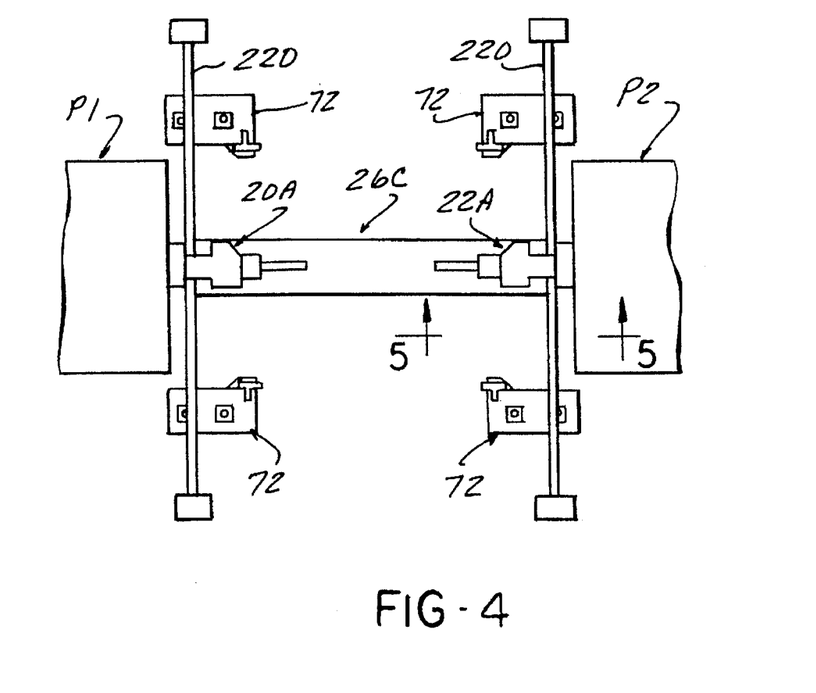
FIG. 4 is a simplified top plan view of an alternative form of the invention.
Figure 5:
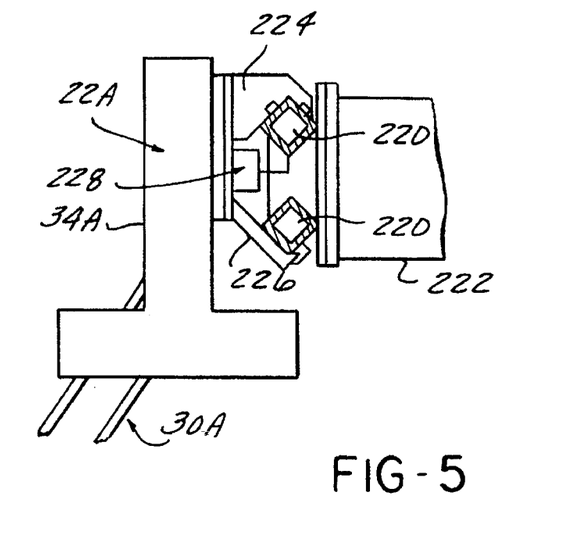
FIG. 5 is a cross-sectional view of a portion of the apparatus in FIG. 4 taken on line 5—5 of FIG. 4.

In FIGS. 4 and 5 an alternative arrangement which employs only a single shuttle conveyor 26C is shown. In the system of FIGS. 4 and 5, four (or more) holding pedestals 72 are employed at locations best seen in FIG. 4. The transfer devices 20A and 22A of the embodiment of FIGS. 4 and 5 are slidably mounted, as best seen in the cross-sectional view of FIG. 5, upon a pair of horizontal tracks 220, fixedly mounted on a suitable fixed frame member 222. The fixed frame 34A of transfer device 22A is formed with a pair of rearwardly projecting arms 224, 226 operatively engaged with rails 220. A suitable drive, schematically indicated at 228 in FIG. 5, is employed to drive the transfer device horizontally along its associated rails 220 as desired. A suitable drive for this purpose is well-known and commercially available, see, for example, U.S. Pat. Nos. 4,193,731 and 4,475,863 for drive arrangements capable of use in the present application.

In the system of FIGS. 4 and 5, the shuttle conveyor 26C and the various holding pedestals 72 are mounted at fixed locations, and the transfer devices 20A, 22A are driven along their respective tracks to unload one set of vacuum cup carrying frames on one pair of holding pedestals 72 and to then shift to pick up another set of vacuum cup carrying frames from the other pair of holding pedestals 72. As in the previously described system, workpiece carrying nests mounted on shuttle conveyor 26C are manually changed as required.

Another form of the invention is illustrated in FIGS. 13–19.

Referring now to FIGS. 13–19, another embodiment of the invention is disclosed as a transfer device 300 generally having first and second bridge structures 312, 314 extending between two work stations such as presses P1 and P2 and attached thereto at each end by motorized slide mounts 318 and 319 respectively, for providing movement of the bridge structures 312, 314 independently along frames 316 and 317 respectively, carried by the presses P1 and P2. Independently operable power lift devices 320, 321 are carried, respectively, by the bridge structures 312, 314 and are capable of vertical movement with respect to bridge structures 312, 314. First and second shuttle track assemblies 322, 323 are carried by the power lift devices 320, 321 located at either end of each shuttle track assemblies 322, 323, each pair of power lift devices 320, 321 being capable of movement in unison to provide parallel up and down movement of the shuttle track assemblies with respect to the horizontal plane. First and second shuttle units 324, 325 are carried by first and second shuttle track assemblies 322, 323 respectively, and are capable of movement along each respective shuttle track. Third and fourth shuttle track assemblies 326, 327 are carried by the first and second shuttle track units 324, 325 respectively, and are capable of movement along each respective shuttle unit. Vacuum cup carrying units 330 are carried at each end by third and fourth shuttle tracks 326, 327 and are capable of movement along each third and fourth shuttle track to provide positioning capability of the vacuum cup carrying units 330 by the transfer device in each individual work station.

The article carrying device includes first and second vacuum cup gripper sets 328, 329 usually provided with one or more branches which carry vacuum cups arranged in a pattern such that the cups can grip and stably support a workpiece such as described in greater detail hereinbefore in FIGS. 1–12. The present invention also enables an automatically and quickly performed mounting or dismounting of the vacuum cup carrying units 330 upon a carrier boom of a transfer device and, thus, in accordance with the present invention, separate vacuum cup carrying frames are utilized, each separate frame being dedicated to one particular type of body panel or workpiece.

The vacuum cup carrying unit and the third and fourth shuttle track assemblies are constructed with a quick disconnect coupling assembly 61 of the type described hereinbefore and disclosed in U.S. Pat. Nos. 4,898,287 and 4,905,850 and described hereinbefore with respect to FIGS. 9–12.

Figure 14:
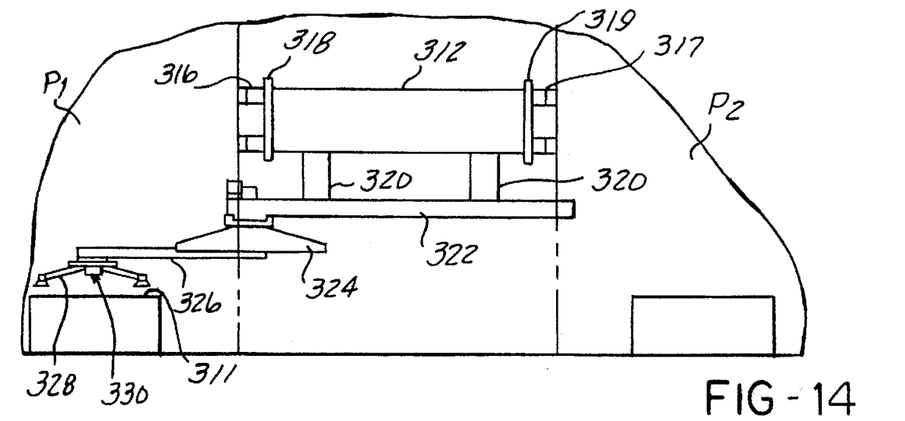
FIG. 14 is a side view as seen in the direction of arrow A in FIG. 13 showing the article carrying device at a first work station.

Now referring to FIGS. 14–19, an example of the present invention is shown in normal operation. In FIG. 14, the first bridge structure 312 is shown extending between the first and second work stations on frames 316 and 317 with movable tracks for lateral adjustment normal to the common path of movement of the shuttle tracks 322 and 326. The power lift devices 320 raise and lower the shuttle track assemblies 322 and 326 along with the shuttle unit 324 and vacuum cup carrying unit 330 to engage, lift and transfer the workpieces 332 and 334 from the first work station or press P1 to the second work station or press P2. The first shuttle track assembly 322 allows movement of the first shuttle unit 324 along the shuttle track 322 for principal movement of the device and thus the workpiece 332 from one work station to another. The third shuttle track 326 provides for extension of the article gripper sets 328, 329 into either work station to extend the movement of the workpiece into the work station.

Figure 16:
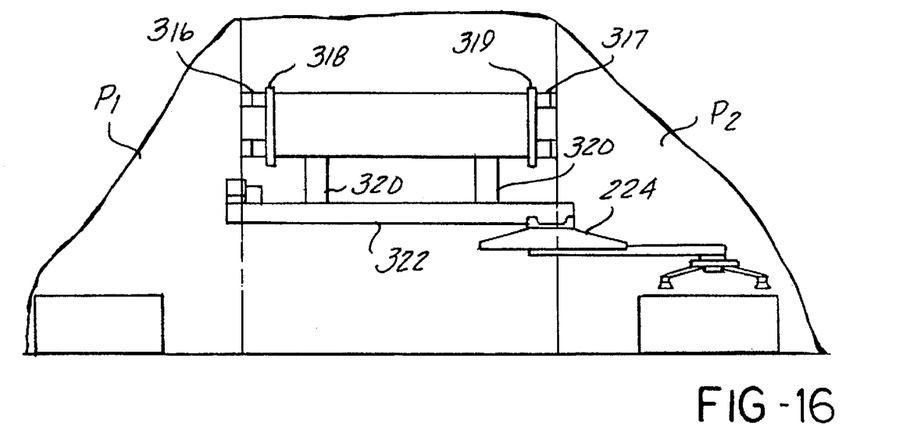
FIG. 16 is a side view similar to FIG. 14 showing the article carrying device at a second location.

FIG. 14 shows the apparatus fully extended into the first work station or press P1 in position for engagement of a workpiece located in the first work station 311. FIG. 16 shows the apparatus fully extended into the second work station or press P2 for engagement or release of the workpiece into the second work station or press P2.

Figure 13:
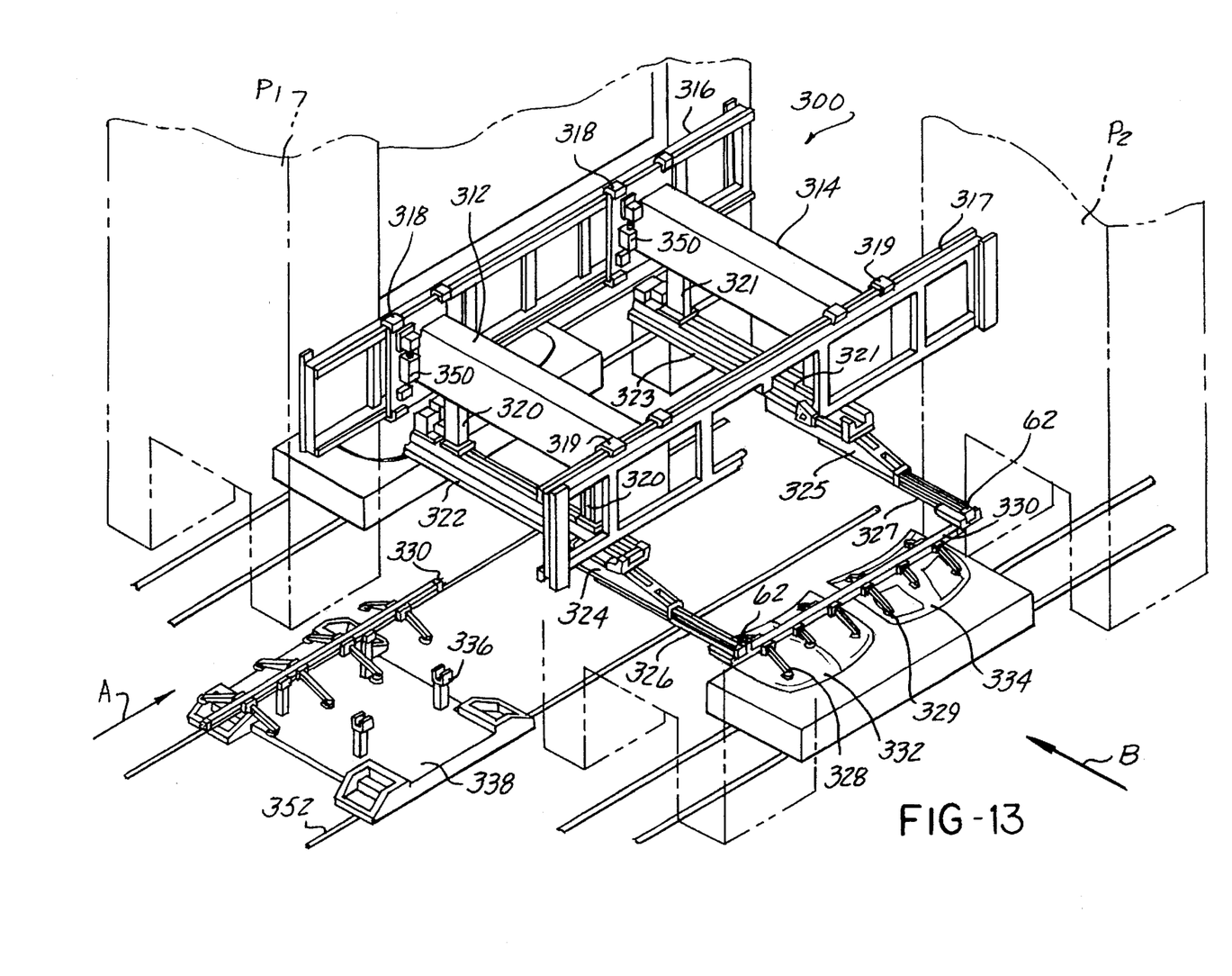
FIG. 13 is a perspective view of another embodiment of a space saving transfer unit in accordance with the present invention.
Figure 15:
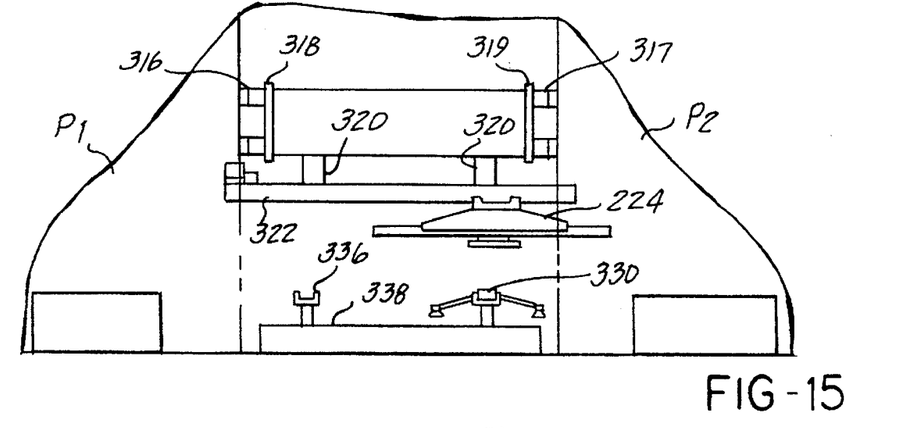
FIG. 15 is a side view similar to FIG. 14 showing the shuttle unit in position to engage the article carrying device located on the tool changer.

An automatic tool changer 338 is shown in FIGS. 13 and 15 with a vacuum cup carrying unit 330 disengaged from the apparatus and placed on the automatic tool changer 338 upon a holding bracket 336. The apparatus is free to then engage a second article carrying device for a different part configuration which can be located on the automatic tool changer 338, as described hereinbefore with respect to FIGS. 1–12. The devices illustrated in FIGS. 9–12 are not shown for clarity.

Figure 17:
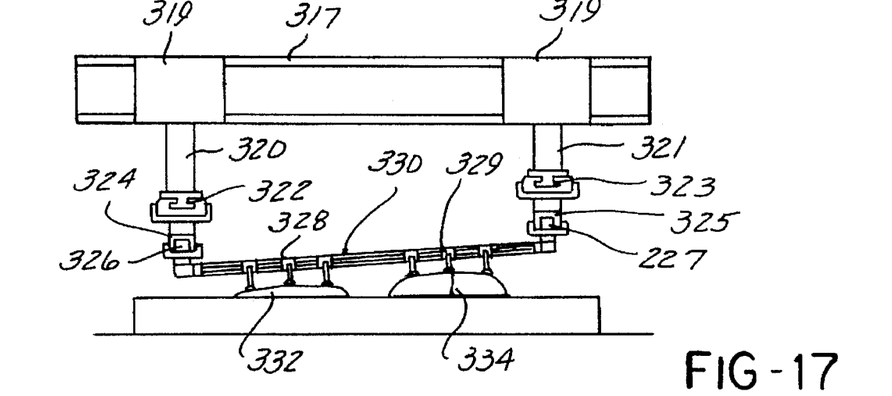
FIG. 17 is a view of the unit as seen in the direction of arrow B in FIG. 13 with the work station removed showing the first power lift device adapting to a small workpiece relative to the workpiece engaged by the second power lift device.
Figure 18:
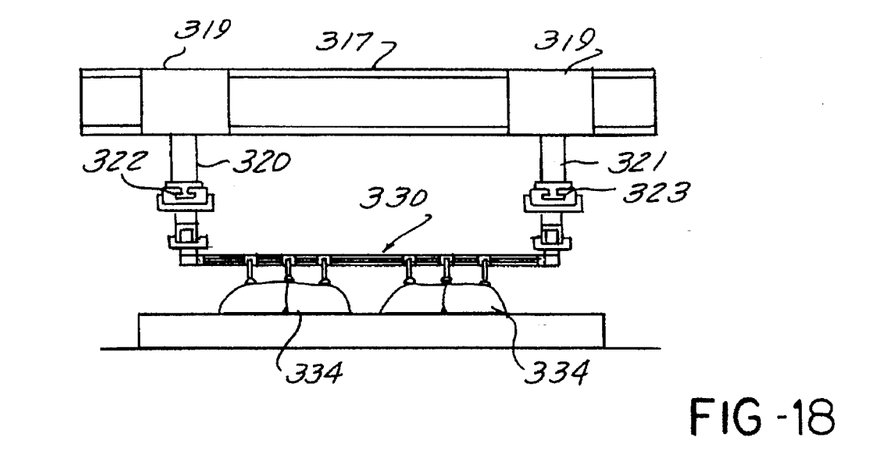
FIG. 18 is a view similar to FIG. 17 showing both power lifts adapting to similarly sized workpieces.
Figure 19:
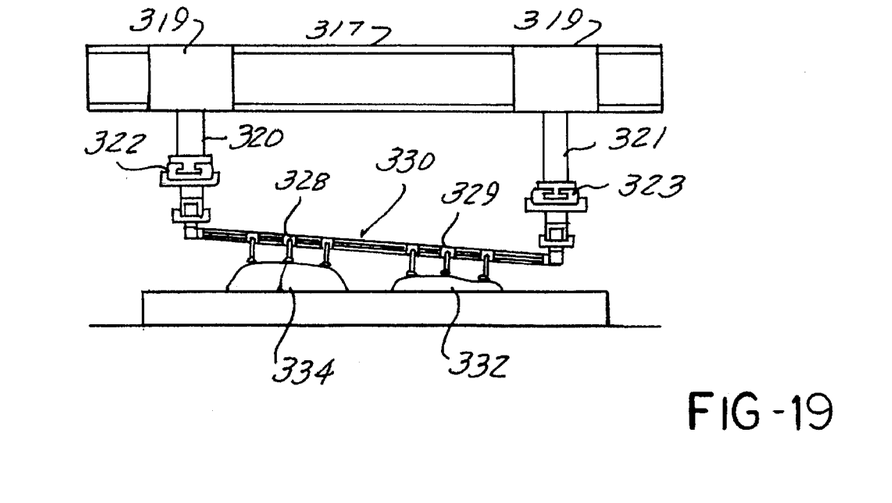
FIG. 19 is a view similar to FIG. 17 showing the second power lift adapting to a smaller part with respect to a larger part adapted by the first power lift.

FIGS. 17–19 illustrate an additional characteristic of the article transfer device 300 used in tandem where different sized and configured parts can be transferred with one apparatus. As seen in FIG. 17, a first part 332 is smaller than a second part 334, this is compensated for by having the first power lift device 320 extended farther than the second power lift device 321 tilting the apparatus and allowing for simultaneous engagement of the two parts 332 and 334. The first and second power lift devices 320, 321 are movable with respect to each other along with their respective shuttle track assemblies connected thereto allowing a tilting motion of the article carrying frame 330 with respect to the horizontal. As shown in FIG. 18, equally configured parts 334 can be transferred with the transfer device as well, as by simply extending the power lift devices 320, 321 the same distances. FIG. 19 shows how the smaller part 332 can be engaged on either gripper sets 328 or 329 by adjusting the power lift device accordingly. Appropriate computer systems can control the positioning of the various components of the device 300 as necessary to automatically achieve the aforementioned results.

In use, the bridge structures 312 and 314 are positioned with respect to each other by activating appropriate motors 350 carried on the slide mounts 318, 319. The lateral position of the bridges 312, 314 with respect to each other is dependent upon the size of the vacuum cup carrying unit 330. In one embodiment, the automatic tool changer 338 may be moved on rails 352 to a position beneath the bridge structures 312, 314 whereupon the power lift devices 320, 321 will be operable to lower the shuttle track assemblies 322, 323 into position with respect to the carrying unit 330. The shuttle track assemblies 322, 323 are likewise manipulated until the quick disconnect couplings schematically illustrated at 62 are appropriately aligned with mating couplings on the carrying unit 330 and the same is engaged in the manner described hereinbefore with respect to FIGS. 9–12. An alternate arrangement would be to extend the side frames 316, 317 laterally of the presses P1 and P2 in a configuration similar to that disclosed in FIG. 4. In such an arrangement, the slide mounts 318, 319 would be moved along the frames 316, 317 to position the bridge structures 312, 314 above a stationary cup carrying unit 330 whereupon the same may be engaged by the transfer device 300 in the same manner as described hereinbefore with respect to FIG. 4.

In operation, when a shuttle track assembly is fully extended to the press, such as shown in FIG. 14 at P1, the same is lowered by means of the power lift devices 320, 321 until the vacuum cup carrying unit 330 engages the workpiece with the press P1. Upon engagement, the workpiece is raised by means of power lift devices 320, 321 and the shuttle 324 is activated to transfer the workpiece to the press P2, as illustrated in FIG. 16. While unusual, it may be possible that the orientation of the workpieces 332, 334 may be in the orientation, as illustrated in FIG. 17, when removed from press P1 but may have to be changed to a different orientation when brought to press P2. That change in orientation may require a raising or lowering of the cup carrying units 330 so as to properly position the workpieces 332, 334 with respect to the press P2 or it may be necessary to activate the motors 350 to shift the bridges 312, 314 in unison, left-to-right, so as to properly orientate the workpieces 332, 334 with respect to the press P2.

It can best be seen that the present invention provides great flexibility in transferring workpieces from one press to another and yet accomplishes the transfer in a simple and inexpensive manner.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A workpiece handling apparatus for transferring workpieces along a transfer path extending from a first work station to a second work station wherein said work stations may be selectively set up to perform work operations on workpieces of a first configuration or on workpieces of a second configuration, said workpiece handling apparatus comprising:

a transfer unit having a carrier member moveable along a plurality of selected paths, one of said selected paths corresponding to at least a portion of said transfer path;

a first workpiece gripping unit adapted to releasably grip and support a workpiece of said first configuration;

a second workpiece gripping unit adapted to releasably grip and support a workpiece of said second configuration;

a first and a second holding unit respectfully mounted at locations spaced from said transfer path, each of said holding units including locating means for releasably supporting either of said first and second gripping units;

first coupling means on said carrier member and second coupling means on each of said first and second gripping units cooperable to releasably couple said carrier member to one of said first and second gripping units in response to movement of said carrier member relative to said one of said gripping units;

locking means on said carrier member moveable between a locked position and an unlocked position, said locking means being operable in said unlocked position to accommodate relative movement between said carrier member and said one of said gripping units for releasably coupling said carrier member to one of said first and second gripping units and operable in said locked position to releasably lock said carrier member in said one of said gripping units coupled to each other;

lock actuator means operable when said carrier member is coupled with one of said first and second gripping units supported on said first and second holding units, respectively, for selectively actuating said locking means to its locked and unlocked position; and each of said gripping units having an elongate central frame member having said second coupling means located at one end of said central frame member and a pair of longitudinally spaced vertical bores extending upwardly from the bottom of said central frame member, said locating means having support means for supporting said central frame member in a substantially horizontal position, and a pair of spaced locating pins fixedly secured to and projecting vertically upwardly from said support means and adapted to be received in said vertical bores in said central frame member to retain said central frame member supported on support means against horizontal displacement relative to said support means.

2. The invention defined in claim 1, wherein said second coupling means comprises a rod-like member projecting longitudinally from said one end of said central frame member, said first coupling means having a horizontal bore extending into said carrier member adapted to slidably receive said rod-like member, said carrier member being moveable horizontally relative to said holding means along a second selected path to and from said first and second coupling means with said central frame member of said gripping units supported upon said support means, said rod-like member being seated in said bore and said carrier member when said gripping unit and said carrier member are coupled, and said carrier member being moveable vertically relative to said holding means to lift said gripping units upwardly clear of said locating pins or to lower said gripping units onto said support means with said locating pins received in said bores of said central frame member.

3. The invention defined in claim 2, wherein said rod-like member has a transverse slot and said locking means comprises a locking member moveable relative to said carrier member into and out of said slot respectfully to said locked and said unlocked positions when said carrier member is coupled with said gripping units to respectively lock and unlock said carrier member and said gripping units to and from each other.

4. The invention defined in claim 3, wherein each of said first and second gripping units comprises a plurality of vacuum cups mounted on said gripping units and adapted to releasably grip said first and second workpieces, said rod-like member being sealingly received in said bore and having a passage therethrough in fluid communication with the vacuum cups mounted on said gripping unit, and vacuum inducing means in said carrier member in fluid communication with said bore and said passage when said gripping unit and said carrier member are coupled with each other.

5. The invention defined in claim 3, further comprising a reversible motor means on each of said holding means operable to drive said locking member to said locked and said unlocked position when said carrier member is coupled with said gripping units supported on said holding means.

* * * * *